3,660,378
2-BENZYLTHIOINOSINE-5'-PHOSPHATE AND DERIVATIVES THEREOF
Kiyofumi Ishii, Ikeda, Jun Toda and Hisashi Aoki, Suita, and Yutaka Kuwada, Ashiya, Japan, assignors to Takeda Chemical Industries, Ltd., Osaka, Japan
No Drawing. Filed Feb. 20, 1969, Ser. No. 801,145
Claims priority, application Japan, Feb. 20, 1968, 43/10,711; Nov. 19, 1968, 43/84,775
Int. Cl. C07d 51/54
U.S. Cl. 260—211.5 R
4 Claims

ABSTRACT OF THE DISCLOSURE

The 2-benzylthioinosine-5'-phosphate has the ability for improving or enhancing the flavor of foods and beverages. Moreover, there is a significant synergistic action between the compound and monosodium glutamate. The compound is produced by phosphorylating 2-benzylthioinosine or 2-benzylthio-2',3'-isopropylideneinosine.

---

This invention relates to a novel seasoning compound and composition, a method for preparing such compound and composition and a method for improving or enhancing the flavor of foods or beverages.

5'-purinenucleotides such as 5'-inosinic acid and 5'-guanylic acid have been employed in practice as chemical condiments because of their strong flavor-enhancing effect (see French Pats. Nos. 1,219,220 and 1,255,334).

It has now been found that 2-benzylthioinosine-5'-phosphate having the following structure:

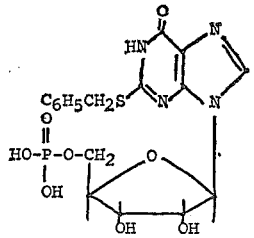

which is a novel compound, has a much higher ability to improve or to enhance the flavor of foods and beverages than that of 5'-inosinic acid and that of 5'-guanylic acid.

It has further been found that there is a significant synergistic action between 2-benzylthioinosine-5'-phosphate and monosodium glutamate.

It is an object of the present invention to provide the novel compound and novel seasoning compositions prepared therefrom. Another object of the present invention is to provide a method for preparing the said seasoning composition. Further object of the present invention is to provide a method for improving or enhancing the flavor of foods or beverages.

2-benzylthioinosine-5'-phosphate to be employed in the present inventin is prepared, for example, by phosphorylating the hydroxyl group at the 5'-position of 2-benzylthioinosine or 2-benzylthio-2',3'-isopropylideneinosine and subjecting the resultant product to hydrolysis. Said phosphorylation and the subsequent hydrolysis may be effected, for example, in the following manner:

(A) 2-benzylthio-2',3'-isopropylideneinosine is allowed to react with a phosphorylating agent. As the phosphorylating agent, there may be employed, for example, pyrophosphoryl tetrachloride, phosphoryl chloride or partially hydrolyzed phosphoryl chloride. The phosphorylation reaction proceeds smoothly at a temperature of from about 0° C. to about 10° C. When a reaction solvent is required, a conventional organic solvent such as dioxane or pyridine is employed. The hydrolysis of the resultant product is carried out by per se known procedure, for example, by weakening the acidity of the reaction mixture desirably to about pH 1 to 2 with the addition of an alkaline material such as sodium hydroxide, sodium carbonate and heating the mixture at a temperature of from about 60° C. to about 80° C. for from 15 to 60 minutes to give 2-benzylthioinosine-5'-phosphate.

(B) 2-benzylthioinosine is directly allowed to react with a phosphorylating agent. In this case employment of phenols e.g. phenol, cresol, xylenol as the reaction solvent and of pyrophosphoryl tetrachloride as the phosphorylating agent gives best results. The reaction proceeds smoothly at a temperature of from about 0° C. to about 10° C. The resultant product is hydrolyzed by a simple conventional manner, for example, by pouring the reaction mixture into water, preferably cooled water, to give 2-benzylthioinosine-5'-phosphate.

2-benzylthioinosine or 2-benzylthio-2',3'-isoproylindeneinosine to be employed as the starting material may be prepared, for example, by allowing an alkali metal salt or ammonium salt of 2-mercaptoinosine or 2-mercapto-2',3-'isopropylideneinosine to react with a benzyl halide such as benzyl chloride or benzyl bromide at a room temperature (15° to 30° C.) in a suitable solvent.

For the purpose of this invention, 2-benzylthioinosine-5'-phosphate thus obtained may be employed in the free form or as a physiologically acceptable salt such as an alkali metal salt (e.g. sodium salt, potassium salt), an alkaline earth metal salt (e.g. calcium salt, magnesium salt), an ammonium salt, or a non-toxic amine salt such as cyclohexylamine salt.

The threshold value in water of disodium 2-benzylthioinosine-5'-phosphate determined by "The Forced-Choice Method of Limits" described in "American Journal of Psychology," vol. 69, pp. 672 to 673, is 0.003%. Thus, the threshold value of disodium 2-benzylthioinosine-5'-phosphate is far lower than that of disodium 5'-inosine per se, i.e. 0.022%, which means that the compound of the present invention can be detected at a far lower concentration than 5'-inosinic acid. Further, as mentioned hereinbefore, when 2-benzylthioinosine-5'-phosphate is employed in combination with monosodium glutamate, a remarkable synergistic action is exhibited between this compound and the monosodium glutamate. As clearly shown in tests described hereinafter, in the copresence of monosodium glutamate, the flavor-enhancing effect of 2-benzylthioinosine-5'-phosphate is 7.2 times as strong as that of 5'-inosinic acid per se.

Furthermore, 2-benzylthioinosine-5'-phosphate is characterized by the following excellent properties:

(1) Not only is it chemically stable but it is relatively stable against phosphatase;

(2) It is non-toxic to mammals;

(3) It can be dissolved in various kinds of edible organic solvents or edible oils and fats; and (4) It can be employed as one of the various kinds of physiologically acceptable salts.

2-benzylthioinosine-5'-phosphate may be added to foods or beverages in the solid state or in a liquid state i.e. dissolved in water or a palatable and edible organic solvent, e.g. alcohol. In improving or enhancing the flavor of foods or beverages, the foods or beverages are mixed with 2-benzylthioinosine-5'-phosphate, or are impregnated with a solution of 2-benzylthioinosine-5'-phosphate, or the solution is sprinkled over the food. The addition of 2-benzylthioinosine-5'-phosphate is carried out during or after the preparation of the foods or beverages.

Foods or beverages to be seasoned include, for example, fermented foods such as bean paste (miso), soy sauce, vinegar or sake, paste such as ham, sausage, steamed fish paste (kamaboko or chikuwa), meats such as whale meat, poultry meat, pork or beef, noodles such as marcaroni, milk, and its processed products such as cow's milk, condensed milk or cheese, processed vegetables such as tomato juice or canned spinach, and cooked foods such as soups or stews.

In most cases, it is preferable to employ 2-benzylthioinosine-5'-phosphate together with monosidium glutamate, and, if desired, other chemical condiments such as disodium 5'-guanylate or sodium succinate. The ratio of 2-benzylthioinosine-5'-phosphate to the monosodium glutamate is advantageously from about 1/1000 to about 1/5, most advantageously from about 1/500 to about 1/20 by weight.

The preparation of the seasoning composition comprising 2-benzylthioinosine-5'-phosphate and monosodium glutamate may be carried out by simple mixing, or by preparing a base material of either 2-benzylthioinosine-5'-phosphate or the monosodium glutamate and successively adhering the other component to the base material. If desired, a composition of the 2-benzylthioinosine-5'-phosphate and monosodium glutamate, irrespective of whether it is powdery or granular, may be coated with a known coating agent. Aliphatic acid esters of sugars, e.g. sucrose fatty acid ester, gelatin, casein, edible waxes, stearic acid, vegetable proteins, monoglycerides and the like may be used as the coating agent.

The most effective amount of 2-benzylthioinosine-5'-phosphate to be employed varies with the kinds of foods or beverages, but, generally from about 0.0002 to 0.03% relative to the foods or beverages is advantageous.

In the instant specification and claims, percentages are by weight, parts by volume bear the same relationship to parts by weight as do milliliters to grams, the "two-sample directional test," "constant method" and "probit analysis" employed in the following test are those described on pp. 330-332 of "Principles of Sensory Evaluation of Food" published by Academic Press, New York and London, in 1965, pp. 118-141 of "Psychometric Methods," 2nd. edition published by McGraw-Hill Book Company, Inc., New York, and "Probit Analysis, a Statistical Treatment of the Sigmoid Response Curve" published by Cambridge Univ. Press in 1952, respectively.

TEST 1

Sample A: An aqueous solution containing 0.8% of sodium chloride plus 0.03% of disodium 2-benzylthioinosine-5'-phosphate; and Sample B: An aqueous solution containing 0.8% of sodium chloride plus 0.03% of disodium 5'-inosinate.

The two-sample directional tests were used between Sample A and Sample B, wherein 19 out of 20 persons judged the flavor of Sample A to be stronger than that of Sample B (significant at 0.1% level).

TEST 2

Sample C: An aqueous solution containing 1% of soy sauce, 0.6% of sodium chloride plus 0.001% of disodium 2-benzylthioinosine-5'-phosphate.

Sample D: An aqueous solution of the same composition as Sample C except that 0.001% of disodium 2-benzylthioinosine-5'-phosphate is replaced by the same amount of disodium 5'-inosinate.

The two-sample directional tests were used between Sample C and Sample D, wherein 17 out of 20 persons judged the flavor of Sample C to be stronger than that of Sample D (significant at 1% level).

TEST 3

In order to compare quantitatively the flavor-enhancing effect of disodium 2-benzylthioinosine-5'-phosphate with that of disodium 5'-inosinate, further tests were carried out according to the "constant methods" (Panel; 50 members) in which the Sample E is a standard sample and Samples $E_1$ to $E_5$ are variable ones.

Samples and results:

Sample E

Sodium chloride, percent _____ 0.8
Monosodium glutamate, percent _____ 0.100
Disodium 2-benzylthioinosine-5'-phosphate, percent _____ 0.00025

| Sample | Percent | | | Number of persons who judged the flavor of Sample E to be stronger in comparison with samples $E_1$ to $E_5$ |
|---|---|---|---|---|
| | Sodium chloride | Mono- glutamate | Disodium 5'-inosinate | |
| $E_1$ | 0.8 | 0.100 | 0.00084 | 34 (68%) |
| $E_2$ | 0.8 | 0.100 | 0.00135 | 32 (64%) |
| $E_3$ | 0.8 | 0.100 | 0.00200 | 24 (48%) |
| $E_4$ | 0.8 | 0.100 | 0.00285 | 16 (32%) |
| $E_5$ | 0.8 | 0.100 | 0.00396 | 10 (20%) |

The probit analysis as to the above-mentioned results revealed that 0.00025% of disodium 2-benzylthioinosine-5'-phosphate is equivalent to 0.00181% of disodium 5'-inosinate in its flavor enhancing effect, and, therefore, that the flavor-enhancing effect of disodium 2-benzylthioinosine-5'- phosphate is 7.2 times as strong as that of disodium 5'-inosinate.

Example 1

78 parts by weight of 2-benzylthioinosine is dissolved in 1000 parts by volume of metacresol. Into the resultant solution is added dropwise with stirring and ice-cooling (0°–10° C.) 140 parts by weight of pyrophosphoryl chloride. The mixture is kept standing with stirring at the same temperature for 4 hours. The reaction mixture is poured into 10,000 parts by volume of diethyl ether to give colorless precipitates. The precipitates collected by filtration are washed with diethyl ether and dissolved into 50% ethyl alcohol. The resulting solution is subject to treatments first with activated charcoal and subsequently with cation exchange resins (Na+ type of Dowex 50) to give crystalline powder of disodium 2-benzylthioinosine-5'-phosphate. The yield is 50 parts by weight. Melting point: 203°–205° C. (decomposition).

*Elementary analysis.*—Calculated for $$C_{17}H_{17}N_4O_8SPNa_2 \cdot 2H_2O$$

(percent): C, 37.10; H, 3.85; N, 10.18; Na, 8.35. Found (percent): C, 37.45; H, 4.29; N, 9.53; Na, 8.0.

Ultraviolet absorption:  264 m$\mu$, 281 m$\mu$ (Shoulder)

Example 2

0.05 part by weight of disodium 2-benzylthioinosine-5'-phosphate, 40 parts by weight of table salt, 13 parts by weight of sugar, 0.1 part by weight of citric acid, 15 parts by weight of monosodium glutamate, 5 parts by weight of hydrolyzed vegetable protein, 0.2 part by weight of onion powder and 6 parts by weight of vegetable shortening are homogeneously mixed to give about 70 parts by weight of powdery soup composition.

1 part by weight of this product is dissolved in 50 parts by volume of hot water to give a soup which has enhanced flavor.

Example 3

To 2,000 parts by weight of powdered monosodium glutamate there is added a solution of 10 parts by weight of disodium 2-benzylthioinosine-5'-phosphate and 50 parts by weight of disodium 5'-inosinate in 150 parts by volume of water. The mixture is kneaded, granulated, dried and sieved to give a granular seasoning composition.

This composition has a high ability to enhance and to improve the flavor of, for example, cream soup when added thereto in the range of from about 0.05 to about 0.1%.

Example 4

Soy sauce prepared by a conventional method is sterilized. To 2,000 parts by volume of thus-treated soy sauce, there is uniformly added 0.1 part by weight of disodium 2-benzylthioinosine-5'-phosphate to give improved soy sauce which has enhanced flavor.

Example 5

To 10,000 parts by volume of Worcestershire sauce prepared by a conventional method, there are added 1 part by weight of dipotassium 2-benzylthioinosine-5'-phosphate and 10 parts by weight of monosodium glutamate to give a Worcestershire sauce with an enhanced flavor.

Example 6

Tomato juice is prepared by a conventional method. To 10,000 parts by volume of the tomato juice, there is added 1 part by weight of disodium 2-benzylthioinosine-5'-phosphate and the mixture is sterilized to give a tomato juice with an enhanced flavor.

Example 7

To 8,000 parts by weight of fish-paste containing 80% water, there are added 250 parts by weight of salt, 30 parts by weight of monosodium glutamate and 2 parts by weight of disodium 2-benzylthioinosine-5'-phosphate and the mixture is kneaded. To the mixture is added 1,000 parts by weight of lard, 350 parts by weight of potato starch and 400 parts by weight of wheat starch and the ingredients thoroughly mixed. The resultant mixture is packed in a casing. The raw fish sausages obtained are steamed at 85° C. to 90° C. for 1 hour to give fish sausages with an enhanced flavor.

What is claimed is:

1. A member of the group consisting of 2-benzylthioinosine-5'-phosphate and physiologically acceptable salts thereof.

2. A physiologically acceptable salt of 2-benzylthioinosine-5'-phosphate according to claim 1.

3. A compound according to claim 1, said compound being 2-benzylthioinosine-5'-phosphate.

4. A compound according to claim 2, said compound being disodium 2-benzylthioinosine-5'-phosphate.

References Cited

UNITED STATES PATENTS 3,408,206  10/1968  Yamazaki et al. __ 260—211.5 R
3,501,456  3/1970  Shen et al. _____ 260—211.5 R LEWIS GOTTS, Primary Examiner J. R. BROWN, Assistant Examiner U.S. Cl. X.R.

424—180; 99—140 N